US009582560B2

(12) United States Patent
Tretikov et al.

(10) Patent No.: US 9,582,560 B2
(45) Date of Patent: Feb. 28, 2017

(54) PARTNERSHIP RELATIONSHIP MANAGEMENT SYSTEM TO SYSTEM DATA SYNCHRONIZATION

(71) Applicant: SugarCRM Inc., Cupertino, CA (US)

(72) Inventors: Lila Tretikov, Los Gatos, CA (US); Deepali Szczesny, Cupertino, CA (US)

(73) Assignee: SUGARCRM INC., Cupertino, CA (US)

(*) Notice: Subject to any disclaimer, the term of this patent is extended or adjusted under 35 U.S.C. 154(b) by 541 days.

(21) Appl. No.: 13/844,403

(22) Filed: Mar. 15, 2013

(65) Prior Publication Data

US 2014/0279898 A1    Sep. 18, 2014

(51) Int. Cl.
*G06F 17/30* (2006.01)

(52) U.S. Cl.
CPC .............. *G06F 17/30575* (2013.01)

(58) Field of Classification Search
USPC ................................................. 707/620, 634
See application file for complete search history.

(56) References Cited

U.S. PATENT DOCUMENTS

| | | | | |
|---|---|---|---|---|
| 7,437,320 B2* | 10/2008 | Davidson | ............... | G06Q 10/06 705/7.11 |
| 7,480,500 B1* | 1/2009 | Mittal | ................... | H04W 12/06 455/403 |
| 7,702,918 B2* | 4/2010 | Tattan | ..................... | G06F 21/32 713/186 |
| 8,060,892 B2* | 11/2011 | Ott | ........................... | G06F 9/54 709/201 |
| 8,131,670 B2* | 3/2012 | i Dalfo | ............. | G06F 17/30578 707/610 |
| 8,156,074 B1* | 4/2012 | Multer | ............. | G06F 17/30174 707/610 |
| 8,160,625 B1* | 4/2012 | Boyle | ................... | H04W 4/206 455/414.1 |
| 8,171,022 B2* | 5/2012 | Johnston | ................ | G06Q 30/02 707/723 |
| 8,332,440 B2* | 12/2012 | Parker, III | ............. | G06Q 30/01 707/803 |
| 2004/0220843 A1* | 11/2004 | Walter | ............. | G06Q 10/06311 705/7.13 |
| 2005/0108043 A1* | 5/2005 | Davidson | ........... | G06Q 10/0637 705/7.36 |

(Continued)

*Primary Examiner* — Kim Nguyen

(74) *Attorney, Agent, or Firm* — Steven M. Greenberg, Esq.; CRGO Law

(57) ABSTRACT

Embodiments of the present invention provide a method, system and computer program product for partnership relationship management (PRM) data synchronization in a customer relationship management (CRM) data processing system. In an embodiment of the invention, a method for PRM data synchronization in a CRM data processing system can include receiving a data synchronization request from one of several different CRM systems over a computer communications network. The method additionally can include identifying the one different CRM system from amongst the different CRM systems and locating a mapping of data fields corresponding to the identified CRM system. Finally, the method can include synchronizing data received from the identified one of the different CRM systems data with data in the CRM data processing system that maps to the received data according to the located mapping of data fields.

3 Claims, 2 Drawing Sheets

(56) References Cited

U.S. PATENT DOCUMENTS

| | | | |
|---|---|---|---|
| 2009/0192860 A1* | 7/2009 | Heller | G06Q 30/02 |
| | | | 705/50 |
| 2012/0158757 A1* | 6/2012 | Bhattacharjee | G06F 17/30607 |
| | | | 707/756 |
| 2013/0013589 A1* | 1/2013 | Stevenson | G06Q 30/02 |
| | | | 707/722 |

* cited by examiner

PARTNERSHIP RELATIONSHIP MANAGEMENT SYSTEM TO SYSTEM DATA SYNCHRONIZATION

BACKGROUND OF THE INVENTION

Field of the Invention

The present invention relates to the field of customer relationship management (CRM) data processing systems and methodologies and more particularly to partnership relationship management (PRM) in a CRM data processing system.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

The advent of the Internet has changed the changed the way in which end users approach CRM strategies because advances in technology have also changed consumer buying behavior and especially the way in which businesses communicate with customers and collect data about those customers. More than the past, self-service channels such as the World Wide Web ("Web") and more recently, the mobile computing world, have become the norm rather than the exception leading to easier ways in which to manage customer information electronically.

Partner relationship management (PRM) is business strategy related to CRM in which communication between different companies and respective channel partners can be improved. Web-based PRM software applications enable companies to customize and streamline administrative tasks by making shipping schedules and other real-time information available to all the partners over the Internet. Recently, several CRM application vendors have incorporated into their core CRM application some PRM features, such as Web-enabled spreadsheets shared through an extranet. However, the integration of PRM features into the core CRM system remains mostly an exercise in publishing PRM information to partners. Notably absent from modern PRM integrated CRM systems is two-way coordination of PRM data.

BRIEF SUMMARY OF THE INVENTION

Embodiments of the present invention address deficiencies of the art in respect to PRM integration in a CRM data processing system and provide a novel and non-obvious method, system and computer program product for PRM data synchronization in a CRM data processing system. In an embodiment of the invention, a method for PRM data synchronization in a CRM data processing system can include receiving a data synchronization request from one of several different CRM systems over a computer communications network. The method additionally can include identifying the one different CRM system from amongst the different CRM systems and locating a mapping of data fields corresponding to the identified CRM system. Finally, the method can include synchronizing data received from the identified one of the different CRM systems data with data in the CRM data processing system that maps to the received data according to the located mapping of data fields. In one aspect of the embodiment, the request is received in a connector to the CRM data processing system. In this regard, in another aspect of the embodiment, the CRM data processing system resides behind a firewall and the connector executes in a computing device disposed in a demilitarized zone of the firewall.

In another embodiment of the invention, a CRM data processing system can be configured for PRM data synchronization. The system can include a host computing system that includes one or more different computers each with at least one processor and memory. The system also can include a primary CRM system executing in the memory of the host computing system and a data store of CRM system mappings. Finally, the system can include a PRM synchronization module coupled to the primary CRM system and the data store and executing in memory of the host computing system. The PRM synchronization module can include program code that upon execution in the memory of the computing system is enabled to receive a data synchronization request from one of a plurality of different CRM systems over a computer communications network, to identify the one of the different CRM systems, to locate in the data store a mapping of data fields corresponding to the identified one of the different CRM systems, and to synchronize data received from the identified one of the different CRM systems data with data in the primary CRM system that maps to the received data according to the located mapping of data fields.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for PRM data synchronization in a CRM data processing system. In accordance with an embodiment of the invention, complimentary data mappings for common data fields in respectively different CRM data processing systems can be established in a connector communicatively coupled to both CRM data processing systems. Thereafter, data mapped by the complimentary data mappings can be synchronized between the CRM data processing systems. Optionally, the connector can be positioned in a DMZ of a private network supporting one of the CRM data processing systems such that the synchronization can occur without complex re-configuration of a firewall protecting the private network while remaining accessible not only to the other of the CRM data processing systems but additional CRM data processing systems for which complimentary data mappings have been established with the one of the CRM data processing systems.

Figure 1:
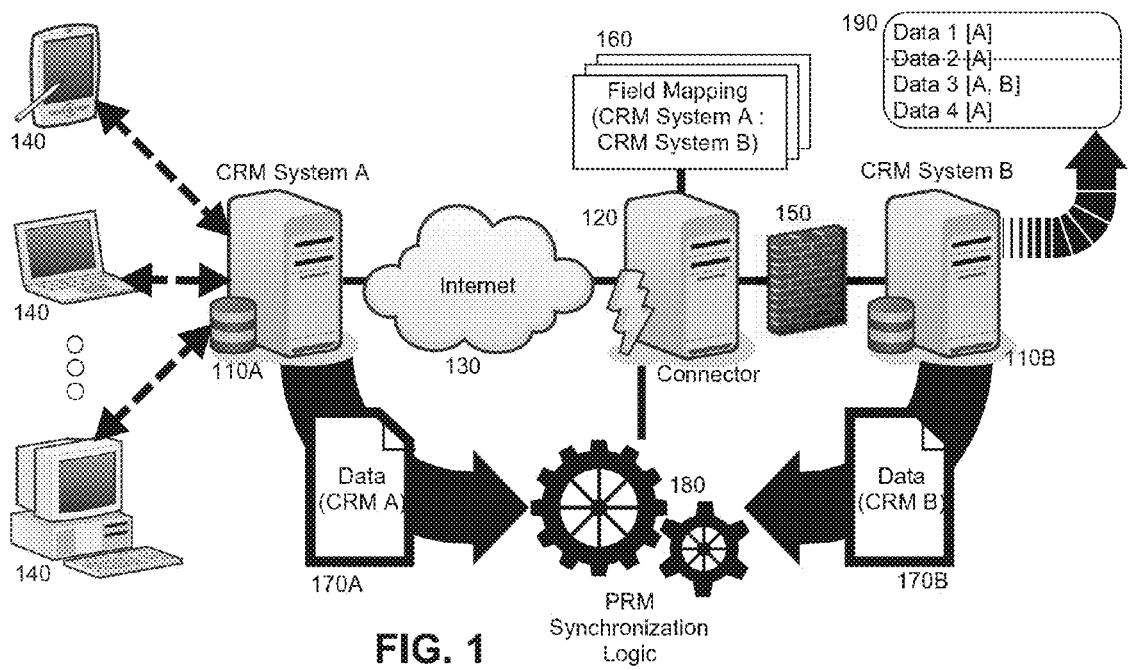
FIG. 1 is a pictorial illustration of a process for PRM data synchronization in a CRM data processing system.

In further illustration, FIG. 1 pictorially shows a process for PRM data synchronization in a CRM data processing system. As shown in FIG. 1, different CRM systems 110A, 110B can be coupled to one another over computer communications network 130 such that each of the different CRM systems 110A, 110B can collect and manage different data for different customers. However, the different CRM systems 110A, 110B can maintain data for common customers. As data 170A is collected and managed in one of the CRM systems 110A through communicatively coupled end user computing devices 140, a request can be provided over the computer communications network 130 to PRM synchronization logic 180 executing in memory of a connector 120 for the other of the CRM systems 110B.

In response, the PRM synchronization logic 180 can map fields of the data 170A to data 170B in the other of the CRM systems 110B according to a map 160 for the partnership relationship between the CRM systems 110A, 110B. Thereafter, the PRM synchronization logic 180 can synchronize the data 170A, 170B between the CRM systems 110A, 110B. In this way, the PRM synchronization logic 180 can cooperatively ensure that both CRM systems 110A, 110B enjoy a common contemporaneous view of common data for common customers despite the disparate nature of the different CRM systems 110A, 110B. Further, the PRM synchronization logic 180 can provide data synchronization for the common data of the CRM systems 110A, 110B notwithstanding the disposition the other of the CRM systems 110B behind a firewall 150 within a private network and without requiring the exposure of the other of the CRM systems 110B to the Internet 130.

Figure 2:
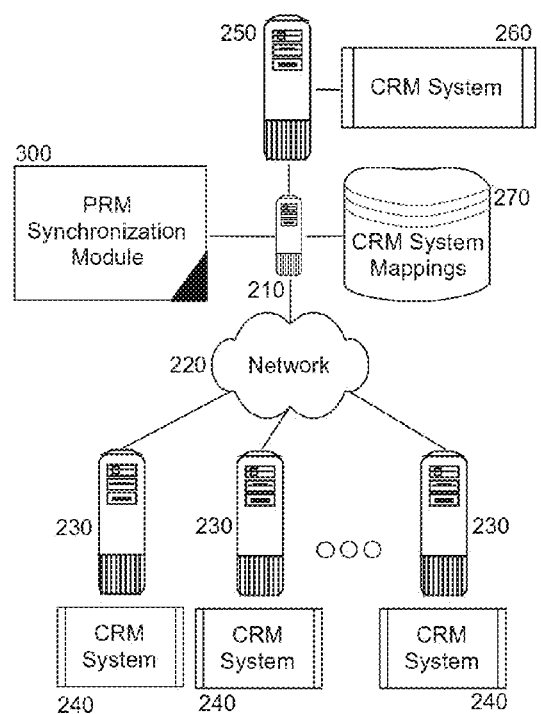
FIG. 2 is a schematic illustration of a CRM data processing system configured for PRM data synchronization; and, FIG. 3 is a flow chart illustrating a process for PRM data synchronization in a CRM data processing system.

The process described in connection with FIG. 1 can be implemented within a CRM data processing system. In yet further illustration, FIG. 2 schematically shows a CRM data processing system configured for PRM data synchronization. The system can include a host computing system 250 that can include one or more different computers each with memory and at least one processor (only a single computer shown for the ease of illustration). The host computing system 250 can support a CRM system 260 executing in memory of the host computing system 250 can be configured for communicative coupling to different servers 230 over computer communications network 220. Each of the different servers 230, in turn, can support the execution of different CRM systems 240.

Of note, the host computing system 250 can be coupled to a different computer 210 over a private network supporting the execution in memory thereof of a PRM synchronization module 300. The PRM synchronization module 300 can be disposed within a "de-militarized zone" (DMZ) of the private network on an opposite portion of a firewall (not shown) separating the different computer 210 from the host computing system 250. Also coupled to the different computer 210, a data store of CRM system mappings 270 can be provided and can include data field mapping for different ones of the CRM systems 240 with respect to the CRM system 260 of the host computing system 250. Each of the mappings in the data store 270 can specifically map data fields from one of the CRM systems 240 to the data fields of the CRM systems 260.

The PRM synchronization module 300 can include program code that when executed in the memory of the different computer 210, can be enabled to receive a request from one of the CRM systems 240 to synchronize data with the CRM system 260. The program code further can be enabled to respond to such request by identifying the requesting one of the CRM systems 240 and by locating within the data store 270 a mapping for the identified one of the CRM systems 240. The program code yet further can be enabled upon locating the mapping to synchronize data between the CRM system 260 and the identified one of the CRM systems 240 according to the mapping of data fields as between the CRM system 260 and the identified one of the CRM systems 240. In this way, the CRM system 260 and the identified one of the CRM systems 240 can maintain common data in synchronization without exposing the CRM systems 260 to public traffic beyond the firewall (not shown) and despite the disparate nature of the CRM systems 240 and the CRM system 260.

Figure 3:
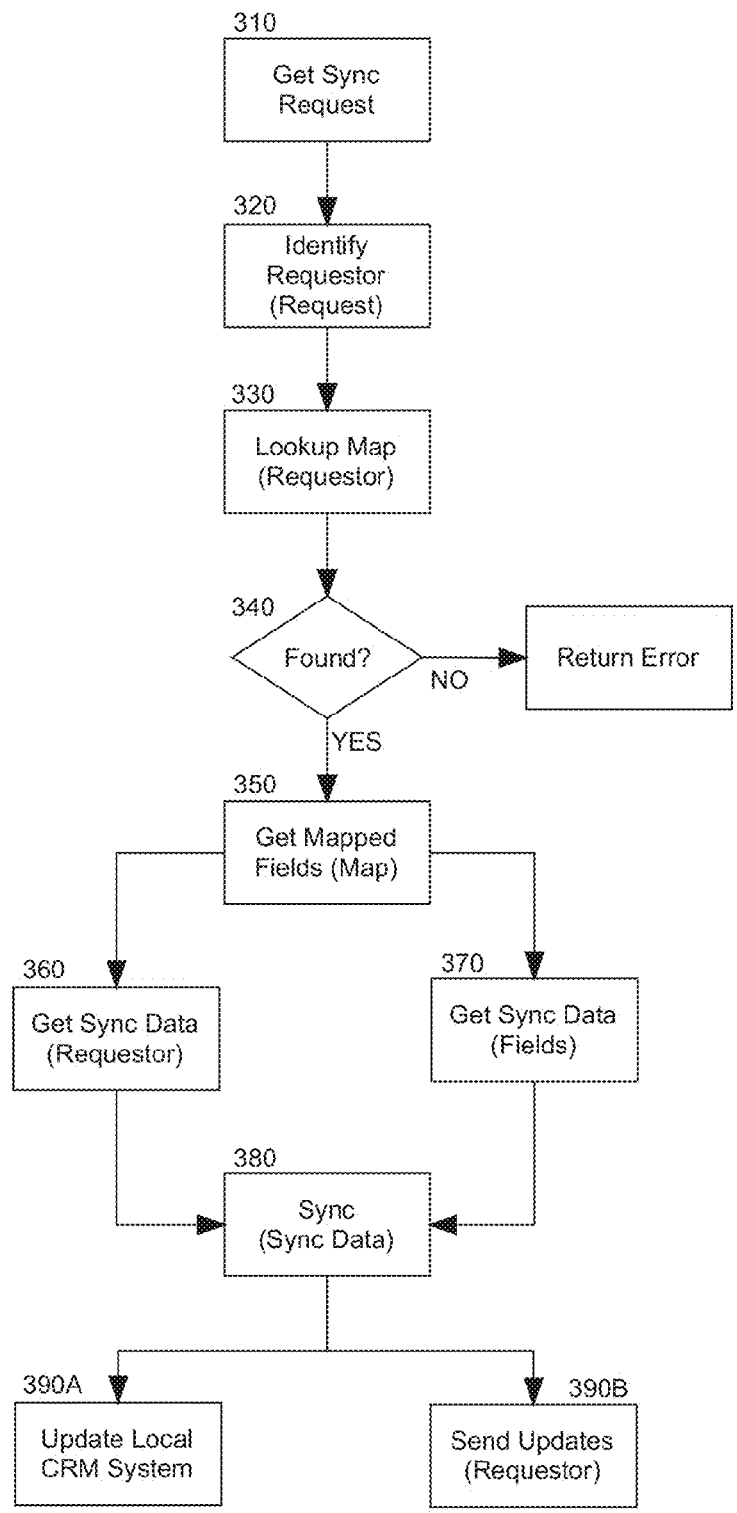

In even yet further illustration of the operation of the PRM synchronization logic 180, FIG. 3 is a flow chart illustrating a process for PRM data synchronization in a CRM data processing system. Beginning in block 310, a synchronization request can be received from a CRM system over a computer communications network. In block 320, the requesting CRM system can be identified and in block 330, a locating of the mapping can be attempted for the identified CRM system. If in decision block 340 a mapping cannot be located for the identified CRM system, in block 400 an error condition can be returned to the requestor. Otherwise, the process can continue in block 350.

In block 350, the mapped fields of data between the identified CRM system and the CRM data processing system can be retrieved and in each of blocks 360 and 370, data corresponding to the mapped fields can be retrieved respectively from the identified CRM system and the CRM data processing system. Thereafter, in block 380 the retrieved data can be synchronized as between the identified CRM system and the CRM data processing system. Finally, in blocks 390A and 390B, each of the identified CRM system and the CRM data processing system can be updated with the synchronized data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for partnership relationship management (PRM) data synchronization in a customer relationship management (CRM) data processing system, the method comprising:

receiving in a CRM data processing system, a data synchronization request from one of a multiplicity of other, different CRM systems from over a computer communications network;

identifying the one of the other, different CRM systems;

locating in the CRM data processing system, a mapping of data fields corresponding to the identified one of the other, different CRM systems; and, synchronizing data received from the identified one of the other, different CRM systems data with data in the CRM data processing system that maps to the received data according to the located mapping of data fields, wherein the request is received in a connector to the CRM data processing system, the CRM data processing system resides behind a firewall and the connector executes in a computing device disposed in a demilitarized zone of the firewall.

2. A customer relationship management (CRM) data processing system configured for partnership relationship management (PRM) data synchronization, the system comprising:

a host computing system comprising a plurality of different computers each with at least one processor and memory;

a primary CRM system executing in the memory of the host computing system;

a data store of CRM system mappings; and, a PRM synchronization module coupled to the primary CRM system and the data store and executing in memory of the host computing system, the PRM synchronization module comprising program code enabled to receive in the primary CRM system a data synchronization request from one of a multiplicity of other, different CRM systems from over a computer communications network, to identify the one of the other, different CRM systems, to locate in the data store a mapping of data fields corresponding to the identified one of the other, different CRM systems, and to synchronize data received from the identified one of the other, different CRM systems with data in the primary CRM system that maps to the received data according to the located mapping of data fields, wherein the PRM synchronization module executes in a memory of a connector to the primary CRM data processing system, the primary CRM data processing system resides behind a firewall in the host computing system, and the connector executes opposite the primary CRM data processing system in a computing device disposed in a demilitarized zone of the firewall.

3. A computer program product for partnership relationship management (PRM) data synchronization in a customer relationship management (CRM) data processing system, the computer program product comprising:

a computer readable storage memory device having computer readable program code embodied therewith, the computer readable program code comprising:

computer readable program code for receiving in a CRM data processing system, a data synchronization request from one of a multiplicity of other, different CRM systems over a computer communications network;

computer readable program code for identifying the one of the other, different CRM systems;

computer readable program code for locating in the CRM data processing system, a mapping of data fields corresponding to the identified one of the other, different CRM systems; and, computer readable program code for synchronizing data received from the identified one of the other, different CRM systems data with data in the CRM data processing system that maps to the received data according to the located mapping of data fields, wherein the request is received in a connector to the CRM data processing system, the CRM data processing system resides behind a firewall and the connector executes in a computing device disposed in a demilitarized zone of the firewall.

* * * * *